United States Patent
Gfeller et al.

(10) Patent No.: US 7,062,687 B1
(45) Date of Patent: Jun. 13, 2006

(54) APPARATUS AND METHOD FOR SETTING A DATA RATE IN A WIRELESS COMMUNICATION SYSTEM

(75) Inventors: Fritz Gfeller, Bonstetten (CH); Wolfgang Schott, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 09/614,231

(22) Filed: Jul. 12, 2000

(30) Foreign Application Priority Data

Jul. 12, 1999 (EP) ............................................. 99113400

(51) Int. Cl.
*G06F 11/00* (2006.01)
*G01R 31/28* (2006.01)

(52) U.S. Cl. .................. 714/704; 714/712; 370/333
(58) Field of Classification Search ................ 714/704, 714/706, 707, 708, 712, 713, 819, 821, 822, 714/43, 56, 46, 748; 377/39, 49, 94; 370/333; 379/58, 63, 350; 455/67.1, 67.3
See application file for complete search history.

(56) References Cited

U.S. PATENT DOCUMENTS

| | | | |
|---|---|---|---|
| 3,934,224 A | * | 1/1976 | Dulaney et al. ............. 375/227 |
| 5,151,902 A | | 9/1992 | Grallert ......................... 371/51 |
| 5,467,341 A | * | 11/1995 | Matsukane et al. .......... 370/253 |
| 5,481,548 A | * | 1/1996 | Wallace ....................... 714/704 |
| 5,822,318 A | | 10/1998 | Tiedemann, Jr. et al. ... 370/391 |
| 5,825,761 A | | 10/1998 | Tanaka et al. ............... 370/333 |
| 5,937,005 A | * | 8/1999 | Obuchi et al. ............... 375/224 |
| 6,094,740 A | * | 7/2000 | Boccuzzi et al. ............ 714/793 |

FOREIGN PATENT DOCUMENTS

| | | |
|---|---|---|
| EP | 0405384 A2 | 9/1992 |
| EP | 0752769 A1 | 1/1997 |
| WO | WO 97/25788 | 7/1997 |
| WO | WO 98/38763 | 9/1998 |

\* cited by examiner

*Primary Examiner*—Christine T. Tu
(74) *Attorney, Agent, or Firm*—Ronald L. Drumheller

(57) ABSTRACT

An apparatus and method for setting a transfer rate of information units in a variable data-rate transmission scheme for a wireless communication system is disclosed. For that, a total counter for counting a total number of received information units, an error counter for counting an error number of received invalid information units, a division unit for dividing the error number by the total number, and a decision unit for setting a transmission-rate parameter are utilizable. The division result is providable as a link-quality measure at an output of the division unit. This link-quality measure is comparable with at least one pre-defined value depending on the result of which, the transmission-rate parameter is setable.

20 Claims, 4 Drawing Sheets

APPARATUS AND METHOD FOR SETTING A DATA RATE IN A WIRELESS COMMUNICATION SYSTEM

TECHNICAL FIELD

The present invention is related to an apparatus and method for setting a transmission-rate parameter in a wireless communication system. More particularly the invention relates to wireless infrared communication systems using variable data rates.

BACKGROUND OF THE INVENTION

Many devices and most mobile computers today are equipped with wireless facilities for communication links. In order to guarantee for a reliable link, the quality of such a link needs to be observed. Several techniques for quality monitoring or estimating are known.

U.S. Pat. No. 5,151,902 describes a method for quality monitoring of at least two series connected transmission sections in a digital signal transmission link for digital equipment conforming to the synchronous digital hierarchy. Error message bytes in which parity errors are accumulated are transmitted in the section overhead of synchronous transport modules as special bytes for the accumulation of parity errors in successive transmission sections. A quality criterion for the monitored transmission link is acquired from a sequence of error message bytes.

The application EP 0 405 384 A2 discloses an apparatus for estimating communication link quality, wherein a communication link quality estimator is described and for a link a M-ary modulation scheme is employed. The link quality estimator is employed at the receiver, which includes a M-ary decoder responsive to received M-ary symbol channel bits for decoding the M-ary symbol into a set of M-ary decoded bits. The link quality estimator includes a time delay circuit for providing a version of the received channel bit M-ary symbol delayed in time by one symbol period. The link quality estimator converts the set of M-ary decoded bits into an auxiliary M-ary channel bit symbol representation in accordance with the M-ary modulation scheme, and compares on a bit-by-bit basis the delayed version of the received channel bit symbol and the auxiliary symbol representation. Detected errors are counted and averaged over a fixed block length to provide a bit error rate estimator.

In the application WO 98/38763 A1 is disclosed a system for an adaptive rate voice system. This adaptive rate system determines voice/channel coding rates, coding strategies and modulation/demodulation for voice quality and intelligibility. A system state estimator, channel status estimator, and channel status monitor provide feedback in the system. That means that a separate feedback channel exists between an adaptive transmitter and receiver. Only if the channel statistics have changed significantly, the channel status monitor computes a new set of critical operating parameters for the system. The system state estimator evaluates a system state indicator S(i) and if that indicator is valid, the critical operating parameters are compared to the previous one. Afterwards, a measure of speech quality is determined. The application describes a software implementation which is not suitable for a fast hardware implementation, since complex operations are necessary which lead to a considerable circuitry.

It is further known, that the transmission power in a wireless communication system can be controlled or adapted to improve the link quality, or that a link-quality depending modulation scheme can be utilized.

Although the present invention is applicable in a variety of communication links it will be described with the focus put on infrared link.

This patent application is related to the PCT Patent Application with International Publication Number: WO 97/25788, entitled "Robust method and apparatus enabling multi-mode wireless optical communication", filed on Jan. 3, 1996, presently assigned to the assignee of the instant application and the disclosure of which is incorporated herein by reference. An optical communication system enabling communication between several co-existing transmitting and receiving stations is disclosed in this PCT Patent Application. In order to allow communication between the co-existing stations, a robust physical layer header is employed which can be understood by all participating stations. Information can be exchanged to allow negotiation and/or adaptation of the data rate used for transmission.

According to the Infrared Data Association (IrDA) recommendations for an Advanced Infrared standard, also abbreviated to AIr standard, a parameter is proposed that allows estimating the quality of a link. This parameter should give an indication of the quality of a link between a source and destination device, also referred to as transmitter and receiver. The physical layer design for an AIr system uses power-efficient L-slot Pulse Position Modulation (L-PPM) in conjunction with an adaptive variable data-rate transmission scheme. In a pulse position modulated signal, a single pulse of T seconds duration is always positioned in one of the L time slots of each L-PPM symbol. The variable data-rate concept has been introduced to improve the signal-to-noise ratio (SNR) under hostile channel conditions. Repetition coding is applied to reduce the rate and simultaneously provide a coding gain to maintain a sufficient bit-error rate in a noisy environment. Each L-PPM symbol is repeated RR times, where RR can be regarded as the rate-reduction factor. In the AIr system, typical values for RR are 1, 2, 4, 8, or 16, which correspond to the data rates 4, 2, 1, 0.5, or 0.25 Mb/s, respectively. Automatic adjustment of the data rate according to the prevailing channel conditions is highly desirable. This calls for an adaptive control of the transmission data rate by measuring a channel link-quality estimate at the receiver, determining from this estimate the required rate-reduction factor for future transmissions, and feeding a recommended parameter RR value back to the transmitter. All necessary operations such as measuring the link quality and deriving the recommended RR factor have to be performed fast to keep the loop delay low. A simple implementation is thus required, which eliminates the possibility to determine the link quality by measuring the signal-to-noise ratio (SNR) at the receiver's side.

OBJECT OF THE INVENTION

It is an object of the present invention to overcome the disadvantages of the prior art.

It is another object of the present invention to achieve a continuous communication link despite changing conditions of the communication channel.

It is still another object of the present invention to provide an apparatus and method for acquiring a link-quality measure in order to recommend a data rate for future transmissions in a wireless communication system.

It is a further object of the present invention to present an apparatus which is characterized by relatively low complexity and simple design.

It is still a further object of the present invention to improve the evaluation of a quality-link measure without significant processing delays.

SUMMARY AND ADVANTAGES OF THE INVENTION

The objects of the invention are achieved by the features of the enclosed claims. Various modifications and improvements are contained in the dependent claims.

The underlying concept of the present invention concerns a dynamically cumulative acquisition scheme of a link-quality measure for setting a transmission-rate parameter and an implementation which is restricted to binary divisions by two. Therefore, a hardware implementation with discrete logic can be presented, which is well-suited for high-speed digital processing. An adaptive variable data-rate scheme for transmitting data in form of information units over a communication link can be improved considerably by this invention. Adaptive adjustment of the data rate is achieved by estimating the channel link quality at the receiver side, deriving from this measure a recommended data rate for future data transmissions over the link, and feeding this information back to the transmitter side. All necessary operations such as determining the link quality and deriving a recommended rate-reduction factor can be performed as fast as required for high-speed digital processing. The present invention proposes a methodology for efficiently acquiring the link-quality measure based on properties of a monitored L-slot Pulse Position Modulation (L-PPM) information-unit sequence. A suitable, easily measurable link-quality measure can be obtained by counting the number of invalid L-PPM information units in a received information-unit sequence. Invalid information units violate the redundant modulation format of PPM, which ensures that only a single pulse can be raised in one of the L-slots of each PPM symbol.

The principle of the cumulative acquisition scheme of the link-quality measure runs as follows. For a contiguous sequence of information units carrying encoded binary information received from the same transmitting station, the number of incoming information units is counted with a total counter. In parallel, the number of detected invalid information units is counted with an error counter. Invalid information units are erroneously received information units. A first evaluation of the link-quality measure is performed after a counted sequence length of $2^m$ information units, where m is an integer parameter that can be chosen arbitrarily but is preferably 8. Subsequently, the link-quality measure is evaluated and updated after each $2^{m+n}$ counted information units, where n=0, 1, 2, ... $n_{max}$. If m=8 is chosen, the first evaluation is executed when 256 information units are counted, the second evaluation and update are executed after 512 counted information units, the third evaluation and update are executed after 1024 counted information units and so forth until a maximum number is reached. With each evaluation the accuracy of the link-quality measure is increased. The evaluation of the link-quality measure is executed by a division unit that divides an error number obtainable from the error counter by a total number obtainable form the total counter. Each division result represents the link-quality measure. This link-quality measure is then comparable within a decision unit with one or more predefined values. Depending on the result of the comparison, a data rate for future transmissions of information units can be determined and a transmission-rate parameter can be set. This transmission-rate parameter is then provided to a transmitting station. Since the transmission-rate parameter was chosen based on the channel or link conditions, a reliable link quality can be provided for future transmissions. Link-quality measure acquisition is stopped when the maximum sequence length with $n_{max}$ is reached or when the transmission of information units is terminated. In the latter case, the last evaluated link-quality-measure value is considered valid. Owing to the chosen doubling of each consecutive information-unit counting period, the necessary division is restricted to a binary division by 2, which can simply be implemented, for example, by a shift register function.

In general, a calculation of the quality of a link is usually very complex since operations like adding, multiplying, and dividing are involved. A software implementation where the quality of a link is calculated by higher communication protocol layers is relatively slow and thus not suitable for high-speed digital processing. On the other hand, a conventional hardware implementation with binary operations leads to excessive gate count and high power consumption. Therefore, a simple evaluation process is required which does not cause excessive processor latency.

It is advantageous that the present invention eliminates the possibility to determine a link quality by measuring the signal-to-noise ratio, also abbreviated to SNR, at a receiver.

The invention shows the advantage that no initial information or information about the data packet length are required. Since the operations, i.e. divisions, are restricted to a binary division by 2, a considerable simplification of hardware circuitry and a reduction of the gate count can be achieved. The latter, leads to a simple design that can be used for good-value manufacturing.

If the link-quality measure and/or the transmission-rate parameter can be sequentially updated, then the advantage occurs that the data rate can be adapted according to the channel or link conditions which may change during the transmission. With an increasing total number of received information units, the link-quality measure can be derived iteratively. The link-quality measure can be computed after receiving a number of information units that are binary multiples of $2^m$, preferably multiples of 256, which shows the advantage that with each evaluation the accuracy of the link-quality measure can be increased whereby a multiple of $2^m$ can be counted and processed easily. Any operation that requires a division can thus be restricted to a binary division by two, which on the other hand is simply implementable in binary logic and thus in hardware When the division is executable after each $2^n$*fcounted information units, where n=0, 1, 2, ... $n_{max}$ and f is a factor that can be chosen but is preferably 256, then the advantage occurs that an automatic shift operation corresponding to n can be applied That means in general, that in a hardware implementation the divisions by 2 can be carried out by shifting the register contents n positions to the right, for example.

If the error number is maintained between at least two subsequent updates or evaluations of the link-quality measure and thus is kept which means not reset, then the advantages occurs that a considerable gain in time can be achieved since the error counter is not reset to zero.

When the division unit comprises storage cells with a shift control or shift facility, then conventional components can be used for an implementation whereas if the division unit comprises a multiplexer with a static logic, then a complex design on a single and small board or chip can be realized, which might be faster in processing as a realization with conventional components.

It seems to be advantageous if the error counter, the total counter, the division unit, and the decision unit can be controlled by a control unit because this control unit provides a central interface to higher communication protocol layers.

If the division unit comprises the error counter or if the division unit is also able to execute the function of the error counter, then the circuitry can be simplified whereby space can be saved which leads to a smaller design. Also, if the decision unit comprises at least one comparator and a derivation unit for deriving from at least one output of the comparator the transmission-rate parameter, then a simple and functional design of the units can be realized.

When at least four predefined values are preloadable thresholds which correspond to a data rate of 4, 2, 1, 0.5 or 0.25 Mb/s, respectively, then a reliable link can be achieved. Since the thresholds can be defined by experiments or experiences, the system and its link quality becomes more stable and reliable. The preloadable thresholds correspond to "L" when a L-PPM (Pulse Position Modulation) is utilized.

It is advantageous that the cumulative acquisition scheme can be used by an adaptive variable data-rate system for transmitting data over an infrared link because the system is compatible to other systems using a similar technique.

When the information units can be encoded by Pulse Position Modulation (PPM), preferably by L-slot PPM (L-PPM), then each received invalid information unit, i.e. each erroneously received information unit, shows an illegal number of pulses which can be easily detected and counted.

With the setting of the transmission-rate parameter, an appropriate transmission data rate can be recommended which means that the transmission data rate can be adapted according to the link-quality measure that reflects the present link conditions. If repetition coding is applied to reduce or increase the transmission data rate, the transmission-rate parameter defines the number of repetitions.

Although the invention is best implementable in hardware, a software implementation is possible which, for instance, could be useful for experiments.

DESCRIPTION OF THE DRAWINGS

The invention is described in detail below with reference to the following schematic drawings.

Figure 1A:
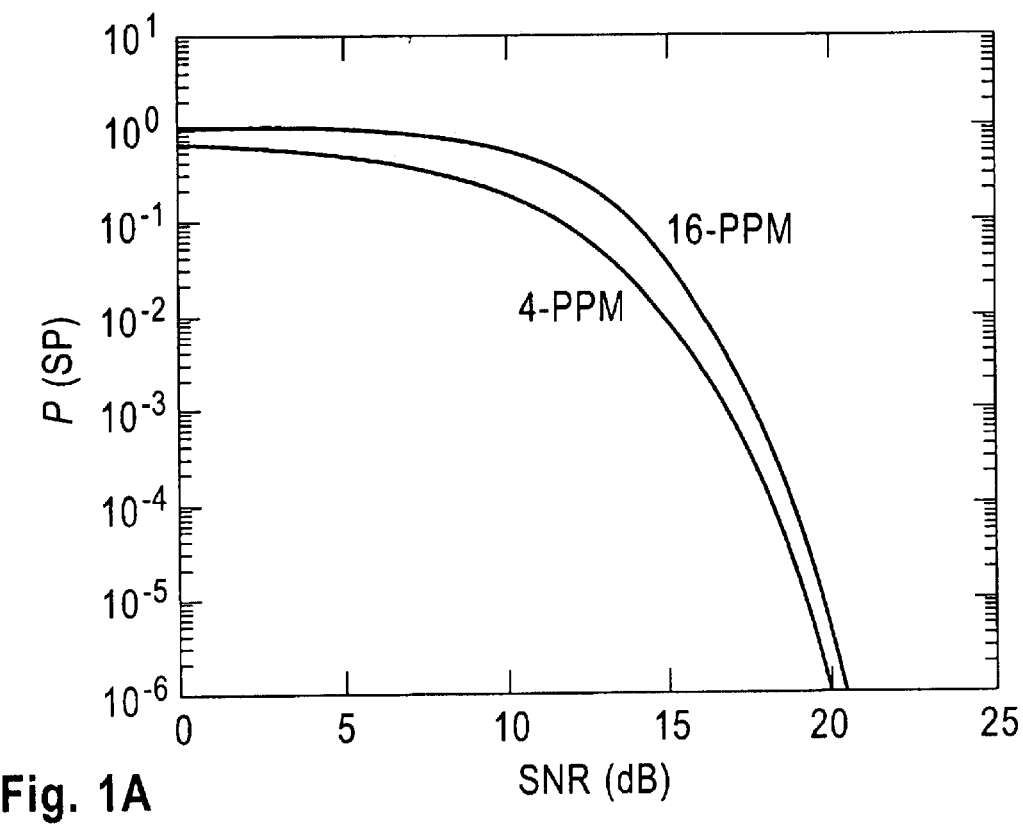
FIG. 1a shows the probability of receiving invalid information units as a function of the signal-to-noise ratio (SNR) for 4-PPM and 16-PPM.

All the figures are for the sake of clarity not shown in real dimensions, nor are the relations between the dimensions shown in a realistic scale.

DESCRIPTION OF THE PREFERRED EMBODIMENT

With general reference to the figures the essential structure of a scheme for setting a transmission-rate parameter RR* according to the invention is described in more detail below.

At first, some basics, in accordance with the present invention, are addressed.

Wireless Communication System

The physical layer of the wireless communication system, used in accordance with the present invention, uses an L-slot Pulse Position Modulation, hereinafter abbreviated to L-PPM, in conjunction with an adaptive variable data-rate transmission scheme. It should be noted, that other modulations schemes can be used instead. L-PPM is achieved by defining an information unit, also referred to as symbol, of duration $t_D$ and subsequently subdividing the information unit into a set of L, e.g. L=2, 4, 8, 16, equal time slots, also called 'chips'. In L-PPM schemes, only one time slot, or chip, per information unit contains a pulse, which means a logical 'one' or '1'. The other chips contain no pulse, which means a logical 'zero' or '0'. If the base is defined as L=4, then the resulting modulation scheme is called four Pulse Position Modulation or 4-PPM. Because there are four unique positions within each 4-PPM information unit, four independent information units exist in which only one chip is logically '1' while all other chips are logically '0', whereby there are the following combinations: 1000, 0100, 0010, 0001. These four information units are the only legal information units allowed in 4-PPM. Each information unit represents two bits of a single data bit pair, which are respectively 00, 01, 10, 11. Logical '1' represents a chip duration when a transmitter is emitting light, while logical '0' represents a chip duration with no light emission. The variable data-rate transmission concept has been introduced to improve the signal-to-noise ratio under hostile channel conditions. Repetition coding can be applied to reduce the rate and simultaneously provide a coding gain to maintain a sufficient bit-error rate in a noisy environment. Each L-PPM information unit is repeated RR times, where RR can be regarded as the rate-reduction factor with which a transmission-rate parameter RR* can be set for future transmission. Automatic adjustment of the transmission-rate parameter RR* according to the prevailing channel conditions is desirable.

Receiver Performance

The quality of a channel is assessed by counting at a receiver the number of invalid L-PPM information units that have been corrupted by noise. Owing to the redundant above-mentioned coding format of PPM, a valid information unit contains only one pulse. Invalid information units, however, contain no or more than one pulse because noise may either erase or create pulses. It should be mentioned that valid information units are not necessarily correctly received because erasure of the correct pulse and creation of a false is possible. Assuming an idealized receiver model allows the computation of an error-rate performance of the receiver in the presence of additive white Gaussian noise. The signal-to-noise ratio, abbreviated to SNR, is defined as $$SNR = 20 \log_{10}\left(\frac{\hat{u}_r}{\bar{u}_n}\right) dB, \quad \{1\}$$

where $\hat{u}_r$ is the peak value of a received signal pulse and $\bar{u}_n$ the standard deviation of the noise signal, both measured at an input of a binary decision circuit of a receiver. Assuming that a received signal is sampled at the pulse peak, that a decision threshold is set at half the pulse amplitude, and that the noise model is additive white Gaussian noise, the probability for making a false decision at every sampling instant can be derived to be $$P_e = \frac{1}{2}\left[1 - \text{erf}\left(\frac{\hat{u}_r}{2\sqrt{2}\,\bar{u}_n}\right)\right], \quad \{2\}$$

where erf is the error function. The probability of detecting exactly Q pulses in an L-PPM information unit is given by $$P(Q) = \frac{(L-1)!}{(L-Q)!Q!}p_e^{(Q-1)}(1-p_e)^{(L-1-Q)}(Lp_e^2 - 2Qp_e + Q), \quad \{3\}$$

$$0 \le Q \le L.$$

With this expression, the probability of detecting an invalid L-PPM information unit can be evaluated to be $$P\{SP\} = \sum_{Q \in \{SP\}} P(Q), \quad \{4\}$$

where SP={0, 2, 3, . . . , L} defines the set of all non-PPM pulse search pattern. In the case of a 4-PPM system, the parameters are L=4 and SP={0, 2, 3, 4}.

In FIG. 1a, the probability P{SP} that any invalid L-PPM symbol is received is shown as a function of SNR for a 4-PPM and a 16-PPM system. The derived function P{SP} versus SNR applies to additive Gaussian noise, which is representative of channel impairments due to slowly varying background light (shot noise) and thermal receiver noise (excessive link distance for a given data rate, optical path obstructions). Cyclostationary noise caused by high-frequency fluorescent background light as well as information-unit error bursts caused by data packets collisions may cause a different information-unit error pattern.

Automatic up or down switching between available data rates should occur whenever the probability of detecting an invalid L-PPM information unit or, equivalently, the relative number of invalid information units in the received sequence crosses an upper or lower threshold. The threshold values are derived so that data packets transmitted over a link are successfully received on average with a predefined packet success rate $C_p$. For an idealized receiver model and with no rate reduction (RR=1), the probability of correctly receiving a data packet of a given length can be calculated to be $$C_p = (1 - p_e)^{\frac{8LN}{\log_2(L)}}, \quad \{5\}$$

where the exponent represents the number of pulses and N the number of bytes per data packet. From equations {1}, {2}, and {5}, the required SNR for achieving the desired packet success rate $C_p$ can be derived to be $$SNR = 20 \log_{10}\left[\sqrt{8}\,\text{erf}^{-1}\left(2C_p^{\frac{\log_2(L)}{8LN}} - 1\right)\right] \text{ dB}. \quad \{6\}$$

The corresponding probability of detecting an invalid L-PPM information unit is given by equation {4} and represents the desired threshold value for RR=1. If a measured link quality is below this threshold, it can be guaranteed that the desired packet success rate $C_p$ is reached with no repetition coding.

For example, a 4-PPM modulation format and a packet size of N=2048 bytes is assumed. Furthermore, the packet success rate $C_p$ should be 0.9, e.g. on average at least 90% of all transmitted packets should be correctly received. According to equation {6}, the required SNR value for achieving the prescribed packet success rate with no repetition coding (RR=1) shall be at least 19.11 dB. FIG. 1a indicates that the corresponding probability of detecting an invalid 4-PPM information unit is lower than $5*10^{-6}$.

If the error rate is higher than the found threshold value, the user data rate can repetitively be reduced by a factor of 2 until the demanded packet success rate is reached. At each reduction step, repetition coding provides a coding gain of 3 dB. Therefore, a 3 dB lower SNR is required after each reduction step to achieve the same packet success rate. For instance, to receive 90% of all transmitted packets correctly, the required SNR values are given by 19.11, 16.11, 13.11, and 10.11 dB for an applied rate reduction of RR=1, 2, 4, 8, and 16, respectively. The corresponding probabilities of detecting an invalid 4-PPM information unit can be determined from FIG. 1a and represent the thresholds for switching between the available data rates.

To provide a meaningful measurement result for reliably switching between the data rates, at least a small number of invalid L-PPM information units have to be present in the received information-unit sequence.

Figure 1B:
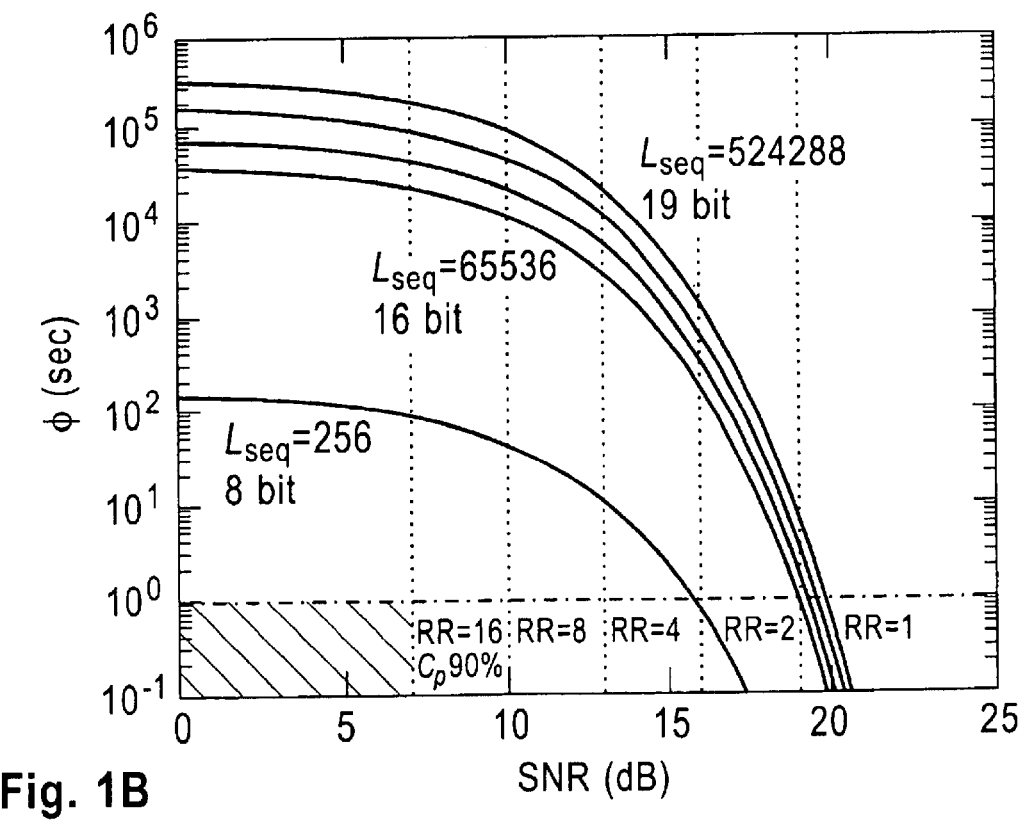
FIG. 1b shows an expected average number of invalid information units in a received 4-PPM information-unit sequence of a fixed length $L_{seq}$ as a function of the signal-to-noise ratio (SNR).

FIG. 1b shows the expected average number of invalid information units, also referred to as average symbol error count (Ø SEC), in a received 4-PPM information-unit sequence of a fixed length $L_{seq}$ as a function of the SNR. The chosen sequence lengths are listed in Table 1 together with additional details on the required number of data packets. The plotted functions have been calculated with an idealized receiver model. As this model assumes stationary channel conditions, the average symbol error count (Ø SEC) increases proportionally with the length $L_{seq}$ of the monitored symbol- or information-unit sequence.

The following Table 1 shows the required numbers of data packets for various rate-reduction factors RR to reach a prescribed 4-PPM information-unit sequence length $L_{seq}$, whereby 1 packet contains 2048 bytes.

TABLE 1

| $L_{seq}$ | RR = 1 | RR = 2 | RR = 4 | RR = 8 | RR = 16 | Binary counter |
|---|---|---|---|---|---|---|
| 65536 | 8 packets | 4 packets | 2 packets | 1 packet | | 16 bit |
| 131072 | 16 packets | 8 packets | 4 packets | 2 packets | 1 packet | 17 bit |
| 262144 | 32 packets | 16 packets | 8 packets | 4 packets | 2 packets | 18 bit |
| 524288 | 64 packets | 32 packets | 16 packets | 8 packets | 4 packets | 19 bit |

The shortest information-unit sequence transmitted over an AIr (Advanced Infrared) link is given by a data packet that carries only a single robust header frame. It has a size of 32 bits and is, for example, exchanged between infrared nodes during connection establishment. As the robust header information controls the operation of the protocol and modem, these frames are always transmitted at the lowest user data rate (RR=16). Therefore, a minimum length data packet causes a transmission of 256 4-PPM encoded information units over the link. In this case, the occurrence of more than one information-unit error per packet at the receiver is only likely if the SNR is less than 16 dB. For higher SNRs, insufficient information is obtained for recommending RR=1 or 2. Nevertheless, the measured information-unit-error count may still be useful for recommending an initial guess of RR>2 after receiving a first frame from an unknown transmitter.

The maximum number of 4-PPM information units that can be transmitted in one burst over the link is given by the allowed maximum channel reservation time defined in the AIr standard. It is set so that up to 126 data packets, each carrying 2048 bytes of user data, can be transmitted at the basic rate (PR=1) over the link.

When detecting only a single invalid 4-PPM information unit within an observed sequence of a given length $L_{seq}$, the approximate SNR and corresponding average packet success rate can be extracted from FIG. 1a and equation {5}. The result is depicted in the following Table 2.

Table 2 shows the packet success rate $C_p$ in the case of monitoring a single invalid information unit in a received 4-PPM information-unit sequence of length $L_{seq}$ for RR=1 and data packets of size 2048 bytes.

TABLE 2

| $L_{seq}$ | $C_p$ |
|---|---|
| 65 536 | ~85% |
| 131 072 | ~93% |
| 261 144 | ~96% |
| 524 288 | ~98% |

FIG. 1b allows the decision thresholds for switching between the data rates to be determined for information-unit sequences with various lengths $L_{seq}$. For example, it is indicated with dotted lines the minimum required SNR for achieving a guaranteed packet success rate of 90%. The crossover points between the dotted lines and plotted curves define the thresholds for each sequence length investigated. When the number of detected invalid information units in a sequence of received information units of given length exceeds the corresponding threshold value, the variable rate shall be reduced by a factor of 2 to maintain the required packet success rate $C_p$. If the SNR is below the value indicated by the leftmost dashed line in the hatched area, the user data rate cannot be reduced further. Insufficient link quality for achieving the requested packet success rate is detected when the link is operated at the lowest user data rate and the number of invalid information units is greater than $0.38 \times L_{seq}$.

Several results have been established for an idealized infrared receiver model. This model allows the computation of the probability of invalid L-PPM information units in a received information-unit sequence as a function of the link-quality measure defined by the SNR or the packet success rate $C_p$. In practice, this relationship also depends on the specific characteristics of the receiver components used and should thus be determined experimentally. Based on these measurement results, the decision thresholds are adjustable.

Definition of Link-quality Measure

A link-quality measure, hereafter also abbreviated to LQM, is defined as the ratio of the number of observed information-unit errors, hereinafter abbreviated to SEC for symbol error count and also referred to as an error number, and a total number of monitored L-PPM information units given by the length, hereinafter abbreviated as $L_{seq}$, of a transmitted sequence, e.g.

$$LQM = \frac{SEC}{L_{seq}}.$$

Continuously monitoring this ratio while receiving a sequence of L-PPM information units provides an estimate of the probability of detecting an invalid information unit P{SP} and thus represents a measure of the SNR present on the link. With an increasing number of information units received, the number of erroneously received information units also increases, improving the accuracy of the LQM estimate. In principle, the proposed cumulative LQM acquisition scheme is capable of computing an estimate for any arbitrary number of monitored L-PPM information units. However, to simplify a hardware implementation, it is proposed that LQM estimates be computed only after the receipt of $2^{8+n}$, n=0, 1, 2, . . . , $n_{max}$, information units. The parameter $n_{max}$ is set to 9 in the preferred embodiment. LQM estimates are thus obtained by $$LQM = \frac{SEC(n)}{L_{seq}(n)}, n = 0, 1, 2, \ldots, n_{max},$$

where SEC(n) is the symbol- or information-unit-error count monitored after the receipt of $L_{seq}(n) = 2^{8+n}$ information units. In the preferred embodiment, a first LQM estimate is taken after monitoring $L_{seq}(0) = 256$ information units. This minimum number of information units for computing the LQM estimate is provided after receiving a robust header. Moreover, it should be noted that the LQM estimates are always computed after receiving a number of information units that are binary multiples of $2^n$, preferably multiples of 256. Therefore, the required division by $L_{seq}(n)$ is in fact restricted to divisions by binary multiples of 2, which can be simply implemented with a shift register in digital hardware. The parameter n can thus be regarded as the number of consecutive binary divisions (shift by n) required after computing LQM(0) and $n_{max}$ as the maximum number of shifts.

Figure 3:
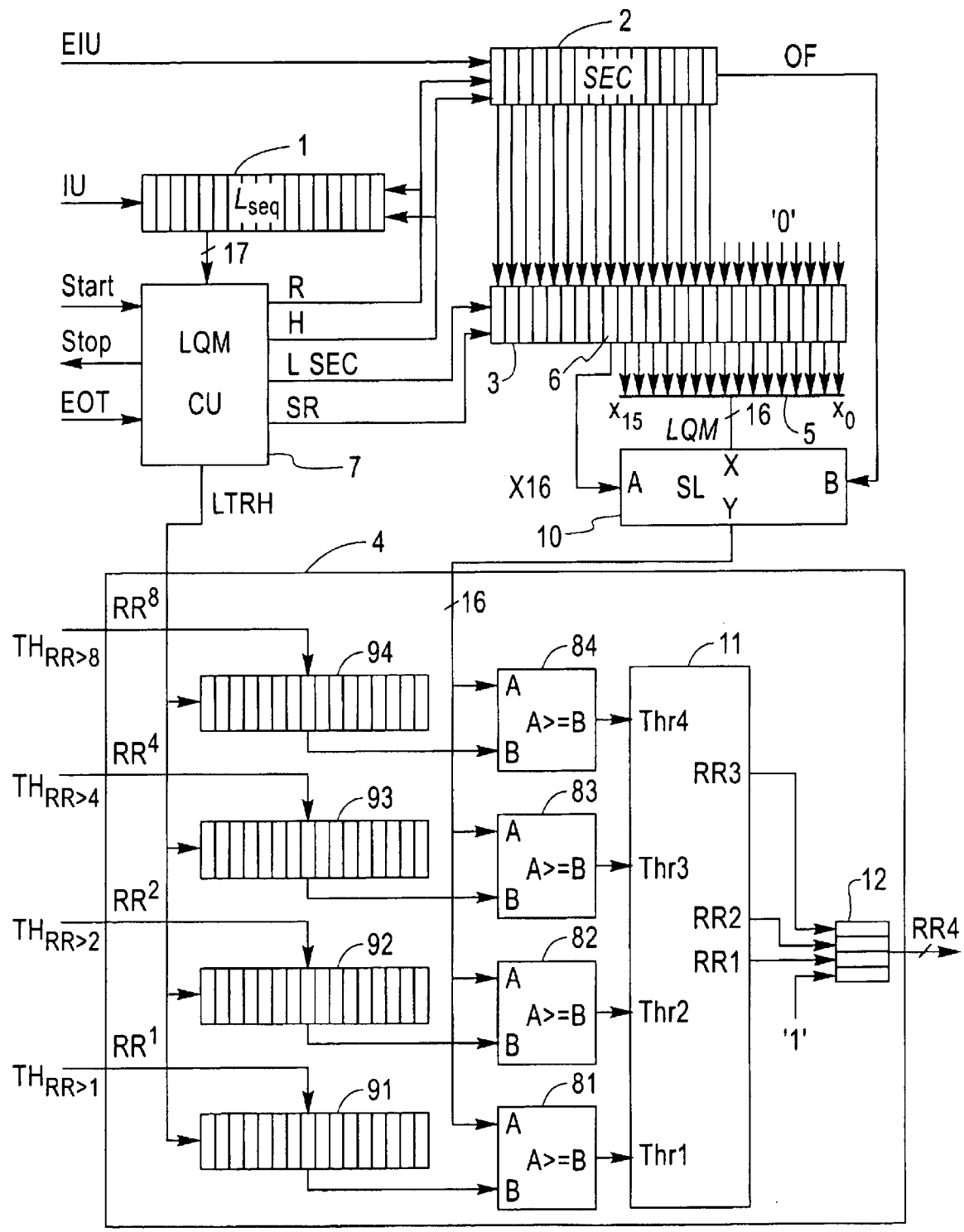
FIG. 3 shows a hardware implementation using discrete logic for the processing of the cumulative LQM acquisition scheme as indicated in FIG. 2.

A hardware implementation of a cumulative LQM acquisition scheme, which is described in more detail with reference to FIG. 3, is based on a binary SEC counter, also referred to as error counter, and a binary $L_{seq}$ counter, also referred to as total counter. Choosing a 16-bit error counter allows the use of a convenient 2-byte register for representing the error number SEC. The maximum length of the monitored 4-PPM information-unit sequence is then $L_{seq}(n_{max}) = 131072$ with $n_{max}=9$, requiring a 17-bit $L_{seq}$ total counter. Note that a 16-bit error counter is sufficient if the maximum information-unit-error count is less than ½ $L_{seq}$ ($n_{max}$). With respect to a binary division operation, the binary representation of LQM is defined as $$LQM_{bin} = x_{15}2^{-2} + x_{14}2^{-3} + x_{13}2^{-4} + x_{12}2^{-5}$$
$$+ x_{11}2^{-6} + x_{10}2^{-7} + x_9 2^{-8} + x_8 2^{-9}$$
$$+ x_7 2^{-10} + x_6 2^{-11} + x_5 2^{-12} + x_4 2^{-13} + x_3 2^{-14}$$
$$+ x_2 2^{-15} + x_1 2^{-16} + x_0 2^{-17}$$

The binary coefficients $x_i$ are stored in a 2-byte register having the format $$LQM_{reg} = \{x_{15}x_{14}x_{13}x_{12}x_{11}x_{10}x_9x_8x_7x_6x_5x_4$$
$$x_3x_2x_1x_0\}.$$

Assuming a monitored information-unit sequence of length $L_{seq}=131072$ and an idealized receiver model with a packet size of 2048 bytes, all coefficients $x_i$, i=0, . . . , 15 equal to zero indicate a packet success rate of $C_p > 0.93$ with no rate reduction (RR=1). If all coefficients are $x_i$, i=0, . . . , 15 equal to one, insufficient link quality at the highest rate reduction (RR=16) is indicated.

As an alternative implementation, the LQM can be represented with binary exponents ranging from −3 to −18; the maximum value of n is thus equal to 10. This modification enlarges the total counter $L_{seq}$ size from 17 to 18 bits while maintaining the LQM register LQM, width at 2 bytes. As a consequence, the maximum LQM value is limited to 0.2499, which no longer allows the indication of insufficient link quality for RR=16, but which is still sufficient for indicating data rate switching between RR=8 and 16, as can bee seen in FIG. 1b.

Acquisition of Link-quality Measure (LQM)

Figure 2:
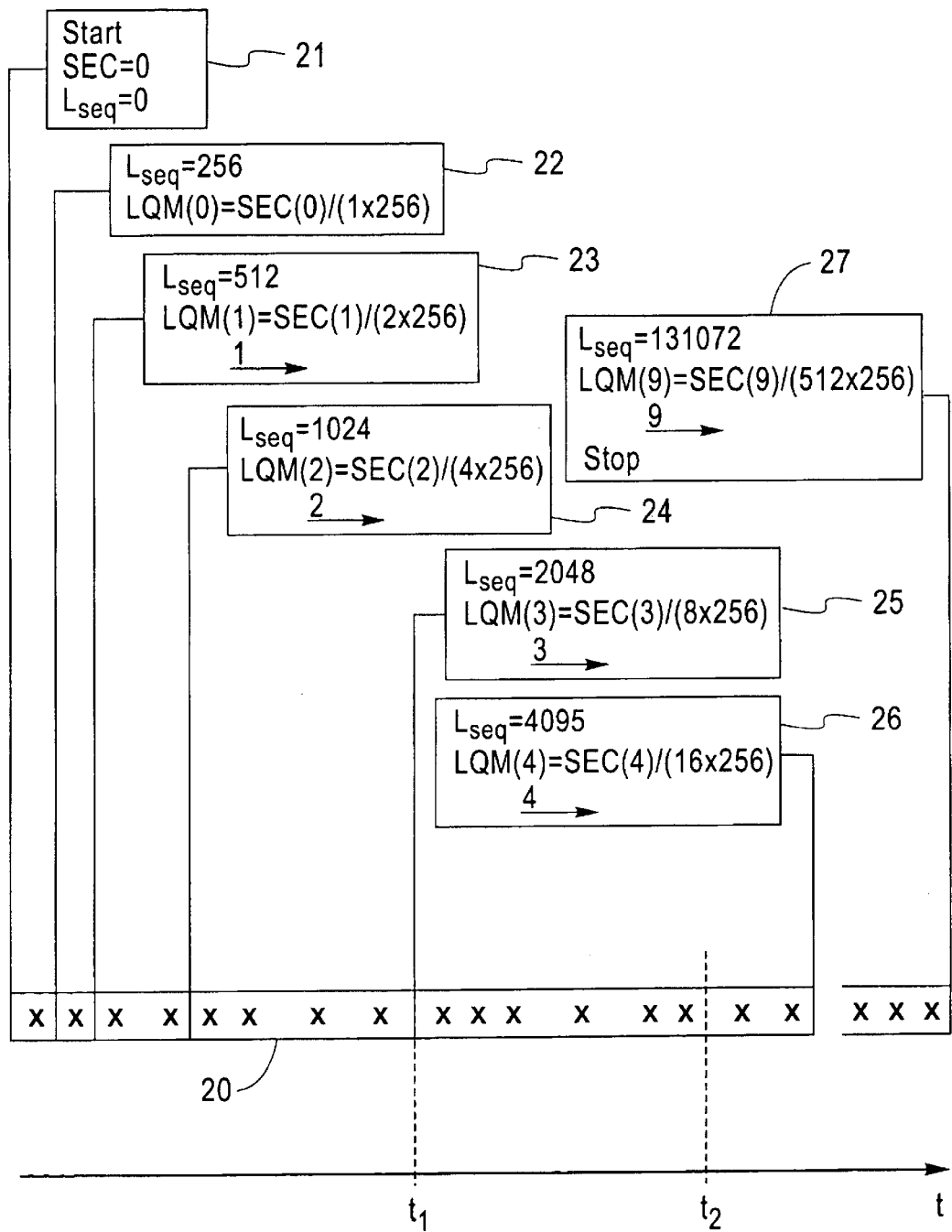
FIG. 2 shows a schematic illustration of a cumulative LQM acquisition scheme according to the present invention.

FIG. 2 shows the principle of a cumulative LQM acquisition scheme. A contiguous sequence of data packets 20, indicated by several x, is depicted over a time axis t. For the contiguous sequence of data packets 20 received from the same transmitting station the number of incoming 4-PPM information units carrying encoded binary information is counted as a total number $L_{seq}$ with a total counter. In parallel, the number of detected invalid 4-PPM information units or symbols is counted as an error number SEC with an error counter. At an initial moment or when ever the cumulative LQM acquisition shall begin, which can be the start of a robust header, the error number SEC and the total number $L_{seq}$ are reset to zero, as indicated in block 21. Then, the cumulative LQM acquisition starts. A first evaluation of the link-quality measure, LQM(0), as shown in block 22, is done after a counted sequence length of only 256 4-PPM information units, which by the way corresponds to the length of the robust header. A second evaluation of the link-quality measure, LQM(1), as shown in block 23, is done after a counted sequence length of 512 4-PPM information units. In the hardware implementation, the division by two can be carried out by shifting the register contents one position to the right, as indicated in block 23 by a "1" above the right-arrow. The next evaluation, a third evaluation of the link-quality measure, LQM(2), as shown in block 24, is done after a counted sequence length at this point of 1024 4-PPM information units. The division by 4 can be implemented as a shift by 2, as indicated in block 24. A fourth evaluation of the link-quality measure, LQM(3), as shown in block 25, is done after a counted sequence length of 2048 4-PPM information units, which requires a shift by 3. Some times later, a fifth evaluation of the link-quality measure, LQM(4), as shown in block 26, is done after a counted sequence length of 4096 4-PPM information units. The division by 16 is carried out by a shift by 4. For the sake of simplification, not all evaluations over the time are depicted in FIG. 2. Generally, LQM(n) is evaluated and updated after each $2^n*256$ counted 4-PPM information units, where n=1, 2, ..., $n_{max}$. Owing to the chosen doubling of each consecutive 4-PPM counting period, the necessary division is restricted to a binary division by 2, which is simply implementable with a shift register function, as shown in an implementation depicted in FIG. 3. With each evaluation, the accuracy of the LQM is increased. The last evaluation of the link-quality measure, LQM(9), as shown in block 27 is here the tenth evaluation, which is done after a counted sequence length of 131072 4-PPM information units, which corresponds to a shift by 9. Afterwards the cumulative LQM acquisition is stopped. The robust header 4-PPM information units should be included in the counting process for every received frame. Therefore, the cumulative LQM acquisition runs over all consecutive robust header fields and data fields within a reservations period. There is no information on the rate-reduction factor used or data-packet length required, except that they enable or disable the total counter and error counter. The cumulative LQM acquisition is stopped when the maximum sequence length with $n_{max}$ is reached or when data transmission is terminated. For example, if end of data transmission EOT is assumed at the moment $t_2$, the last evaluated LQM value, which here is LQM(3) at the moment $t_1$ is considered valid.

FIG. 3 shows a LQM acquisition apparatus for acquiring a link-quality measure LQM and setting a transmission-rate parameter RR* for future transmission of data. In general, data being encoded, received, and transmitted as information units, also referred to as symbols as mentioned above. The apparatus comprises a 17-bit total counter 1 for counting a total number $L_{seq}$ of received information units IU, indicated as IU line in FIG. 3, and, a 16-bit error counter 2 for counting an error number SEC of received invalid information units EIU, indicated as EIU line. The apparatus comprises further a 25-bit shift register 3, hereinafter called division unit 3, connected via an 16-bit register output 5 to a saturation logic 10. Each cell or digit of the error counter 2 is connected to the respective first 16 cells of the division unit 3. An overflow line, labeled with OF, is guided from the error counter 2 to an input B of the saturation logic 10. A ninth cell 6 of the division unit 3 is connected via a line, labeled with $x_{16}$, to an input A of the saturation logic 10. Also, the apparatus comprises a decision unit 4, whereby this decision unit 4 has a first threshold-register 91 that is fed by a first threshold line labeled with $RR^1$, a second threshold-register 92 that is fed by a second threshold line, labeled with $RR^2$, a third threshold-register 93 that is fed by as third threshold line, labeled with $RR^4$, and a fourth threshold-register 94 that is fed by a fourth threshold line, labeled with $RR^8$. Via the threshold lines $RR^1$, $RR^2$, $RR^4$, $RR^8$, a first threshold-value. $TH_{RR>1}$ for RR>1, a second threshold-value $TH_{RR>2}$ for RR>2, a third threshold-value $TH_{RR>4}$ for RR>4, and a fourth threshold-value $TH_{RR>8}$ for RR>8 are provided to the respective threshold-registers 91, 92, 93, 94. These threshold-values $TH_{RR>1}$, $TH_{RR>2}$, $TH_{RR>4}$, $TH_{RR>8}$ are pre-defined values and can be defined as described above. Furthermore, the decision unit 4 comprises a first comparator 81, a second comparator 82, a third comparator 83, and a fourth comparator 84. The first threshold-register 91 has a connection to the first comparator 81, the second threshold-register 92 to the second comparator 82, the third threshold-register 93 to the third comparator 83, and the fourth threshold-register 94 to the fourth comparator 84, respectively. At its input, each comparator 81, 82, 83, 84, has a 16-bit width connection to the output of the saturation logic 10. At its output, each comparator 81, 82, 83, 84 is connected to a derivation unit 11, also referred to as mapping logic 11. This mapping logic 11 is able to receive a first comparator-value $Thr_1$, a second comparator-value $Thr_2$, a third comparator-value, $Thr_3$, and a fourth comparator-value $Thr_4$. The mapping logic 11 derives form the comparator-values $Thr_1$, $Thr_2$, $Thr_3$, $Thr_4$ a recommended rate-reduction factor and outputs based thereon the transmission-rate parameter RR*. The transmission-rate parameter RR* is storeable in a 4-bit RR register 12 and therewith provided for further processing. A control unit 7 controls the apparatus. For that, the control unit 7 is connected to the total counter 1 via a 17-bit line and to the total counter 1 and the error counter 2 by a Reset line, labeled with R, and a Hold line, labeled with H, respectively. The control unit 7 is also connected to the division unit 3 by a Load SEC line, labeled with L SEC, and a Shift-right line, labeled with SR. The control unit 7 is able to receive a start signal, labeled with Start, and an end of transmission signal, labeled with EOT. A stop signal, labeled with Stop, on the other hand, can be sent from the control unit 7. These signals Start, Stop, or EOT are used to communicate with higher protocol levels, e.g. a MAC (Media Access Control) protocol. Each threshold-register 91, 92, 93, 94 is connected to the control unit 7 by a load threshold line, labeled with LTRH in FIG. 3.

In the LQM acquisition apparatus, two binary counters 1 and 2 are used for counting the total number $L_{seq}$ of correctly received information units IU and the error number SEC of erroneously received 4-PPM information units EIU. The latter is done by monitoring the information-unit clock provided by a variable-rate modem, that for the sake of clarity is not depicted in FIG. 3, and by counting the information units EIU marked invalid. The 17-bit total counter 1 can be used for counting up to 131072 information units IU. The 16-bit error counter 2 indicates an overflow if the number of information-unit errors exceeds 65536. If this occurs an overflow signal can be sent to the saturation logic 10 via an overflow line, labeled with OF.

In general, the apparatus works as follows. The register 3 together with the saturation logic 10 derives from the counter values of the total counter 1 and the error counter 2 a 16-bit link-quality measure LQM value. This link-quality measure LQM value is then compared in each of the four 16-bit comparators 81, 82, 83, 84 with the respective preloaded threshold-value $TH_{RR>1}$, $TH_{RR>2}$, $TH_{RR>4}$, $TH_{RR>8}$. These threshold-values $TH_{RR>1}$, $TH_{RR>2}$, $TH_{RR>4}$, $TH_{RR>8}$ are preloaded via the respective threshold lines $RR^1$, $RR^2$, $RR^4$, $RR^8$ into the respective threshold-registers 91, 92, 93, 94 from which the respective comparator 81, 82, 83, 84 then loads the respective threshold-value $TH_{RR>1}$, $TH_{RR>2}$, $TH_{RR>4}$, $TH_{RR>8}$ for the comparison with the link-quality measure LQM value. The mapping logic 11 derives from the comparator outputs a recommended rate-reduction factor. From this the transmission-rate parameter RR* is set and stored in the 4-bit register 12. The iterative computation of the link-quality measure LQM value from the number of valid information units IU and invalid information units EIU is sequenced by the control unit 7.

The control unit 7 is responsible for proper initialization and operation of the total counter 1, the error counter 2, the division unit 3, and the decision unit 4. A control algorithm for the control unit 7 is described with reference to FIG. 4. The link-quality measure LQM acquisition mechanism starts when the first information unit IU, e.g. of a robust header, is received. At this time, the appropriate threshold values $TH_{RR>1}$, for RR>1, $TH_{RR>2}$ for RR>2, $TH_{RR>4}$ for RR>4, and $TH_{RR>8}$ for RR>8 are loaded into the 16-bit threshold-registers 91, 92, 93, 94, respectively. The total counter 1 and the error counter 2 are reset to zero, and further a control parameter n is set to zero. From then on, the control unit 7 watches the count of the total number $L_{seq}$ in the total counter 1. When the count reaches $2^8=256$, (e.g., at the end of the robust header), the control unit 7 instructs the division unit 3 to load the present count of the error number SEC into the upper 16 cells; the remaining 9 lower cells are filled with zeros, as indicated with '0' in FIG. 3. No shift instruction is issued by the control unit 7 because the parameter n is 0. Then, n is set to 1 and, if the end of transmission EOT is not indicated to the control unit 7, information-unit counting continues until the total counter 1 reaches the value $2^9=512$. The control unit 7 now instructs the division unit 3 to load the new count of the error number SEC into the upper cells and zeros in the lower cells of the division unit 3. Immediately after the load operation, the contents of the register of the division unit 3 is shifted to the right by n=1. Then, the parameter n is increased by 1 and the procedure is repeated with n=2. The LQM acquisition mechanism terminates if the maximum number of information units IU has been received or if the end of transmission EOT is indicated to the control unit 7. In either case, the control unit 7 freezes the total counter 1 and error counter 2 and thus all other registers to their current values, and stops the LQM acquisition process.

In the following some implementation details are explained in more detail.

The division unit 3, that is provided as 25-bit shift register, can be implemented with storage cells and a shift facility or as a multiplexer implemented with static logic. Its task in the LQM acquisition apparatus is to load the 16-bit count of the error counter 2 into its upper cells and zeros into its lower cells when the control signal 'Load SEC' is raised via the L SEC line, and divide the result by $2^n$, n=0, . . . , $n_{max}$. The latter operation represents a binary division that can be implemented by shifting the register contents n times to the right. As the register is 25 cells wide and the loaded count of the error number SEC is represented by 16 bits, at most $n_{max}=9$ shift operations can be performed.

After executing the appropriate shift operation, the coefficients $x_i$, i=0, . . . , 15, used in the binary representation of link-quality measure LQM are stored in the 16 lower cells at the output 5 of the shift register of the division unit 3. The representation covers the range $0 \leq LQM<0.5$. Link-quality measure LQM values inside this range are obtained if the error number SEC of invalid information units EIU is less than 50% of the total number $L_{seq}$ of received information units IU. In a very noisy environment it may happen that this percentage is exceeded. In this case, the LQM acquisition apparatus chooses the maximum rate-reduction parameter RR whereby a maximum transmission-rate parameter RR* is set. This is accomplished by saturating link-quality measure LQM to its maximum value (all '1' bit pattern) in case of a range overflow. Such an overflow occurs either if the error counter 2 overflows or if the ninth cell 6 of the shift register of the division unit 3 is set to 1. An implementation, for instance, of the saturation logic 10 with static-logic gates can be simply implemented by use of 16 OR gates, with three inputs. Each OR gate has an input A which is connected to the ninth cell 6 of the shift register of the division unit 3, an input B which is connected to the overflow OF of the error counter 2, and a respective input $x_i$, which is connected to the respective cell of the 16-bit register output 5 ($x_0 \ldots x_{15}$) of the division unit 3. The 16-bit register output 5 represents here the link-quality measure, which is indicated with LQM at the output 5. The outputs of the OR gates ($y_0 \ldots y_{15}$) and therefore the 16-bit line of the saturation logic 10 is guided to each comparator 81, 82, 83, 84.

As mentioned above, four 16-bit comparators 81, 82, 83, 84 are used to compare the binary link-quality measure LQM value with the four threshold-values, $TH_{RR>1}$, $TH_{RR>2}$, $TH_{RR>4}$, $TH_{RR>8}$ stored in the respective four 16-bit threshold-registers 91, 92, 93, 94. Each content of the four thresh old-registers 91, 92, 93, 94 correspond to an appropriate switching threshold for variable data rates. The threshold-values $TH_{RR>1}$, $TH_{RR>2}$, $TH_{RR>4}$, $TH_{RR8}$ use the same binary representation as the link-quality measure LQM value and are downloadable from an controller, that for the simplicity is not depicted in FIG. 3. Each comparator 81, 82, 83, 84 outputs a '1' if the link-quality measure LQM value is greater than or equal to the chosen threshold. A 16-bit comparator can be implemented with four 4-bit comparators.

The four 16-bit comparators 81, 82, 83, 84 output the respective comparator-values $Thr_1$, $Thr_2$, $Thr_3$, and $Thr_4$, and indicate therewith the recommended data rate to be used for the transmission over the evaluated link. The following Table 3 shows five possible comparison results. The rate-reduction factor RR for 4-PPM, possible comparator-values $Thr_4$, $Thr_3$, $Thr_2$, $Thr_1$, and three digits of the transmission-rate parameter RR* are listed in columns in the named order from left to right.

TABLE 3

| Rate Reduction | $Thr_4$ | $Thr_3$ | $Thr_2$ | $Thr_1$ | $RR_3$ | $RR_2$ | $RR_1$ |
|---|---|---|---|---|---|---|---|
| 1 | 0 | 0 | 0 | 0 | 0 | 0 | 0 |
| 2 | 0 | 0 | 0 | 1 | 0 | 0 | 1 |
| 4 | 0 | 0 | 1 | 1 | 0 | 1 | 0 |
| 8 | 0 | 1 | 1 | 1 | 0 | 1 | 1 |
| 16 | 1 | 1 | 1 | 1 | 1 | 0 | 0 |

The transmission-rate parameter RR* is transferred to a transmitting station, as indicated by the output arrow of the 4-bit register 12, in the RR field of the next outgoing MAC frame. The encoding of the RR field is defined in the AIr MAC protocol specification as a 4-bit field. The last significant bit, abbreviated as LSB, is always set to 1, as indicated by '1' in FIG. 3, and the higher order bits are defined as shown in Table 2. A static logic circuitry in the mapping logic 11 maps the outputs of the comparators 81, 82, 83, 84 to an appropriate RR format and the result is stored as the transmission-rate parameter RR* in the 4-bit RR register 12 for further processing.

Figure 4:
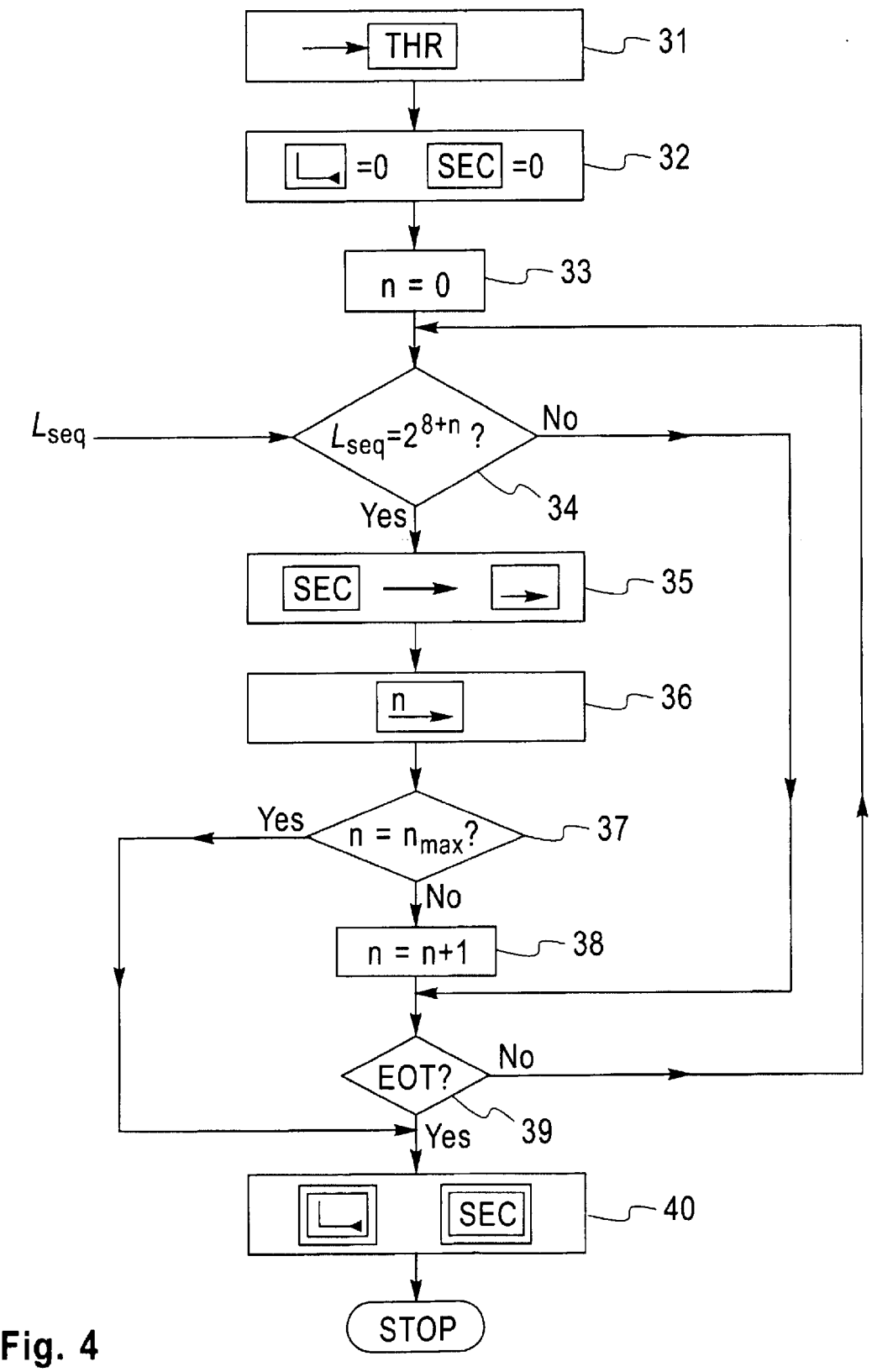
FIG. 4 shows a flowchart indicating executable processing steps within the LQM apparatus as described with reference to FIG. 3.

FIG. 4 shows a flowchart indicating executable processing steps within the LQM apparatus as described with reference to FIG. 3.

When the first information unit IU is received, the LQM acquisition mechanism is started. At this time, the appropriate threshold-values $TH_{RR>1}$, $TH_{RR>2}$, $TH_{RR>4}$, $TH_{RR>8}$ are loaded into the 16-bit threshold-registers 91, 92, 93, 94, respectively, as indicated in block 31. As shown in the next steps, the total counter 1 and the error counter 2 are reset to zero, block 32, and further a control parameter n, block 33, is set to zero. From then on, the control unit 7, as described with reference to FIG. 3, watches the count of the total number $L_{seq}$ in the total counter 1. When the count reaches $2^8=256$, block 34, the path indicated by Y that means 'yes' or 'true' is taken and the control unit 7 instructs the division unit 3 to load the present count of the error number SEC into the upper 16 cells, as indicated in the following block 35; the remaining 9 lower cells are filled with zeros. No shift instruction is issued by the control unit 7 because the parameter n is 0. Then, n is set to 1, block 38, and, if the end of transmission EOT, block 39, is not indicated to the control unit 7 which here is indicated by N that means 'no' or 'false', information-unit counting continues until the total counter 1 reaches the value $2^9=512$, block 34 again. The control unit 7 now instructs the division unit 3 to load the new count of the error number SEC into the upper cells and zeros in the lower cells of the division unit 3, as indicated in block 35 again. Immediately after the load operation, the contents of the register of the division unit 3 is shifted to the right by n=1, as indicated in block 36. Then, the parameters is increased by 1, block 38, and the procedure is repeated with n=2. The LQM acquisition mechanism terminates if the maximum number of information units IU has been received, i.e. here a total number $L_{seq}=2^{8+n_{max}}$ is reached, whereby n is compared with $n_{max}$ in every cycle, as indicated in block 37. If $n=n_{max}$ holds, the path indicated by Y will be taken and the LQM acquisition mechanism stops. The LQM acquisition mechanism terminates as well if the end of transmission EOT, block 39, is indicated to the control unit 7. In either case, the control unit 7 freezes the total counter 1 and error counter 2, as indicated in block 40, and thus all other registers to their current values, and stops the LQM acquisition process.

The present invention can be realized in hardware, software, or a combination of hardware and software. Any kind of computer system or other apparatus adapted for carrying out the method described herein is suited. A typical combination of hardware and software could be a general purpose computer system with a computer program that, when being loaded and executed, controls the computer system such that it carries out the method described herein. The present invention can also be embedded in a computer program product, which comprises all the features enabling the implementation of the method described herein, and which—when loaded in a computer system—is able to carry out this method.

A computer program or computer program means in the present context mean any expression, in any language, code or notation, of a set of instructions intended to cause a device having an information processing capability to perform a particular function either directly or after either or both of the following a) conversion to another language, code or notation; b) reproduction in a different material form.

What is claimed is:

1. An apparatus for setting a transmission-rate parameter for transmission of information units in a wireless communication system, comprising:

a total counter for counting a total number of received information units in a single received sequence of L-slot Pulse Position Modulation (L-PPM) information units;

an error counter for counting an error number of invalid received information units in the sequence of L-PPM information units;

a division unit for dividing said error number by said total number, the division result being providable as a link-quality measure at an output of said division unit, characterized in that said division unit is adapted to automatically perform binary divisions by 2 using a shift operation after n information units are received, where n is some integral power of 2; and a decision unit for setting said transmission-rate parameter by comparing said link-quality measure with at least one predefined value and defining said transmission-rate parameter to assume a corresponding data rate.

2. Apparatus according to claim 1, wherein the link-quality measure or the transmission-rate parameter is sequentially updatable.

3. Apparatus according to claim 1, wherein the error number is maintained between at least two subsequent updates of the link-quality measure.

4. Apparatus of claim 1 further comprising a control unit which controls the total counter, the error counter, the division unit, and the decision unit.

5. Apparatus according to claim 1, wherein the division unit comprises the error counter.

6. Apparatus according to claim 1, wherein the decision unit comprises at least one comparator and a derivation unit for deriving from at least one output of said comparator the transmission-rate parameter.

7. Apparatus according to claim 1, wherein at least four predefined values are preloadable thresholds which correspond to a data rate of 4, 2, 1, 0.5 or 0.25 Mb/s, respectively.

8. An adaptive variable data-rate system for transmitting data over an infrared link comprising an apparatus according to claim 1.

9. An apparatus for setting a transmission-rate parameter for transmission of information units in a wireless communication system, comprising:

a total counter for counting a total number of received information units in a single received sequence of L-slot Pulse Position Modulation (L-PPM) information units;

an error counter for counting an error number of received invalid information units in the sequence of L-PPM information units;

a division unit for dividing said error number by said total number, the division result being providable as a link-quality measure at an output of said division unit; and a decision unit for setting said transmission-rate parameter by comparing said link-quality measure with at least one predefined value and defining said transmission-rate parameter to assume a corresponding data rate, wherein the link-quality measure is derivable iteratively increasing said total number after $2^n*f$ counted information units, with n=0, 1,2, . . . and f a defined factor.

10. Apparatus according to claim 9, wherein the division is executable at a multiple of factor f automatically by a shift operation corresponding to n.

11. An apparatus for setting a transmission-rate parameter for transmission of information units in a wireless communication system, comprising:

a total counter for counting a total number of received information units in a single received sequence of L-slot Pulse Position Modulation (L-PPM) information units;

an error counter for counting an error number of received invalid information units in the sequence of L-PPM information units;

a division unit for dividing said error number by said total number, the division result being providable as a link-quality measure at an output of said division unit; and a decision unit for setting said transmission-rate parameter by comparing said link-quality measure with at least one predefined value and defining said transmission-rate parameter to assume a corresponding data rate, wherein the division unit comprises storage cells having a shift control, or comprises a multiplexer having a static logic.

12. A method for setting a transmission-rate parameter for transmission of information units in a wireless communication system, comprising the steps of:

counting a total number of received information units in a single received sequence of L-slot Pulse Position Modulation (L-PPM) information units;

counting an error number of received invalid information units in said sequence of L-PPM information units;

dividing said error number by said total number and providing the division result as a link-quality measure;

comparing said link-quality measure with at least one predefined value; and automatically setting said transmission-rate parameter depending on the result of the comparison.

13. Method according to claim 12, wherein the link-quality measure or the transmission-rate parameter is sequentially updated.

14. Method according to claim 12, wherein the information units are encoded by Pulse Position Modulation.

15. Method according to claim 12, wherein with the setting of the transmission-rate parameter, a data rate of information units is adapted to the link-quality measure.

16. Method according to claim 15, wherein the data rate depends on a repetition of information units.

17. Method according to claim 12, wherein said counting a total number, counting an error number, dividing, comparing and setting steps are carried out by means of a computer program.

18. A method as recited in claim 12, wherein said decision unit automatically sets the said transmissiion rate parameter.

19. A method for setting a transmission-rate parameter for transmission of information units in a wireless communication system, comprising the steps of:

counting a total number of received information units in a single received sequence of L-slot Pulse Position Modulation (L-PPM) information units;

counting an error number of received invalid information units in said sequence of L-PPM information units; p1 dividing said error number by said total number and providing the division result as a link-quality measure;

comparing said link-quality measure with at least one predefined value; and setting said transmission-rate parameter depending on the result of the comparison, wherein the link-quality measure is derived after receiving a number of information units that is a multiple of $2^n$, with n=0, 1, 2, . . . .

20. Computer readable program code means for causing a computer to effect a determination of a link-quality measure in order to set a transmission-rate parameter for transmission of information units in a wireless communication system, comprising the steps of:

counting a total number of received information units in a single received sequence of L-slot Pulse Position Modulation (L-PPM) information units;

counting an error number of received invalid information units in said sequence of L-PPM information units;

dividing said error number by said total number and providing the division result as a link-quality measure;

comparing said link-quality measure with at least one predefined value; and automatically setting said transmission-rate parameter depending on the result of the comparison.

* * * * *